US011498152B2

(12) United States Patent
Müller

(10) Patent No.: US 11,498,152 B2
(45) Date of Patent: Nov. 15, 2022

(54) SONOTRODE AND METHOD FOR INFLUENCING THE VIBRATORY BEHAVIOR OF A SONOTRODE

(71) Applicant: SCHUNK SONOSYSTEMS GMBH, Wettenberg (DE)

(72) Inventor: Stefan Müller, Wetzlar (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 98 days.

(21) Appl. No.: 16/630,928

(22) PCT Filed: Jul. 12, 2018

(86) PCT No.: PCT/EP2018/069021
§ 371 (c)(1),
(2) Date: Jan. 14, 2020

(87) PCT Pub. No.: WO2019/020397
PCT Pub. Date: Jan. 31, 2019

(65) Prior Publication Data
US 2020/0230736 A1    Jul. 23, 2020

(30) Foreign Application Priority Data
Jul. 28, 2017 (DE) .................... 10 2017 117 078.2

(51) Int. Cl.
| B23K 20/00 | (2006.01) |
| B23K 20/10 | (2006.01) |
| B06B 3/00 | (2006.01) |

(52) U.S. Cl.
CPC .............. B23K 20/106 (2013.01); B06B 3/00 (2013.01)

(58) Field of Classification Search
CPC ............................. B23K 20/10; B23K 20/106
See application file for complete search history.

(56) References Cited

U.S. PATENT DOCUMENTS 8,056,792 B2  11/2011  Coto et al.
8,758,492 B2   6/2014  Büttiker et al.
(Continued)

FOREIGN PATENT DOCUMENTS

CN        2270589 Y   12/1997
CN     204504501 U    7/2015
(Continued)

OTHER PUBLICATIONS

International Search Report dated Nov. 11, 2018, in PCT/EP2018/069021.
(Continued)

*Primary Examiner* — Erin B Saad
(74) *Attorney, Agent, or Firm* — Ladas & Parry LLP; Malcolm J. MacDonald

(57) ABSTRACT

The invention relates to a sonotrode (218) of an ultrasonic welding device with a sonotrode body (224) with sonotrode head (220) with at least one working surface (230) extending in the longitudinal direction of the sonotrode head for welding or welding together and/or deforming and/or cutting at least one item of metallic welding material, wherein the sonotrode head has cross-sections which vary along the working surface in such a way that the cross-section of the sonotrode head in the end region of the working surface extending at the end face is greater than in the middle region of the working surface.

19 Claims, 8 Drawing Sheets

(56) References Cited

U.S. PATENT DOCUMENTS

| | | | |
|---|---|---|---|
| 8,925,612 B2 | 1/2015 | Coto | |
| 9,272,802 B2* | 3/2016 | Hull | B29C 66/3452 |
| 9,358,633 B2 | 6/2016 | Stroh et al. | |
| 2004/0013449 A1 | 1/2004 | Fujimoto et al. | |
| 2009/0283570 A1 | 11/2009 | Gerdes et al. | |
| 2013/0062397 A1* | 3/2013 | Stroh | B23K 20/10 |
| | | | 228/110.1 |
| 2013/0213580 A1* | 8/2013 | Thaerigen | B29C 66/4312 |
| | | | 156/580.2 |
| 2014/0000460 A1* | 1/2014 | Buttiker | B06B 3/04 |
| | | | 96/175 |
| 2014/0203065 A1 | 7/2014 | Zaks et al. | |
| 2015/0068664 A1* | 3/2015 | Stober | B31F 1/10 |
| | | | 156/73.1 |
| 2018/0222126 A1 | 8/2018 | Hsu | |
| 2019/0375166 A1* | 12/2019 | De Cuyper | B29C 66/849 |

FOREIGN PATENT DOCUMENTS

| | | | |
|---|---|---|---|
| CN | 106944738 | A | 7/2017 |
| DE | 1427329 | | 1/1969 |
| DE | 1427329 | A1 | 1/1969 |
| DE | 3328614 | A1 | 12/1984 |
| DE | 20314781 | U1 | 12/2003 |
| DE | 10360623 | B3 | 6/2005 |
| DE | 502004002817 | C5 | 9/2010 |
| DE | 102015206866 | B3 | 7/2016 |
| EP | 0154709 | A1 | 9/1985 |
| EP | 1543911 | A1 | 6/2005 |
| EP | 2353737 | A1 | 8/2011 |
| EP | 2591864 | A1 | 5/2013 |
| JP | H106040 | A | 1/1998 |

OTHER PUBLICATIONS

Chinese Search Report, dated Aug. 20, 2020, corresponding to Chinese Application No. 201880048636.X.

Indian Office Action, dated Jun. 22, 2021, corresponding to Indian Application No. 201937054376.

Japanese Office Action, dated Apr. 19, 2022, corresponding to Japanese Application No. 2020-504374.

* cited by examiner

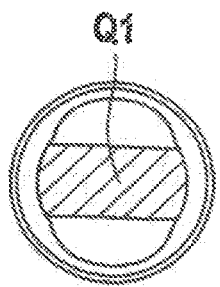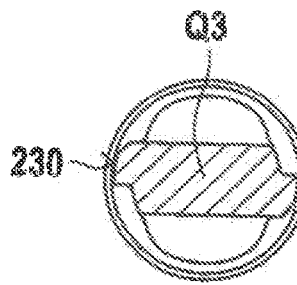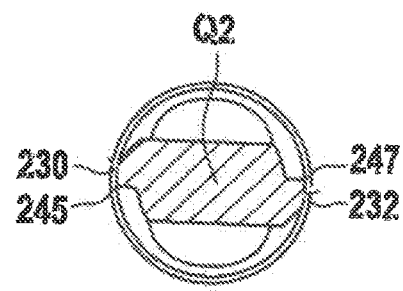
Fig. 7 (C-C)  Fig. 8 (B-B)  Fig. 9 (A-A)
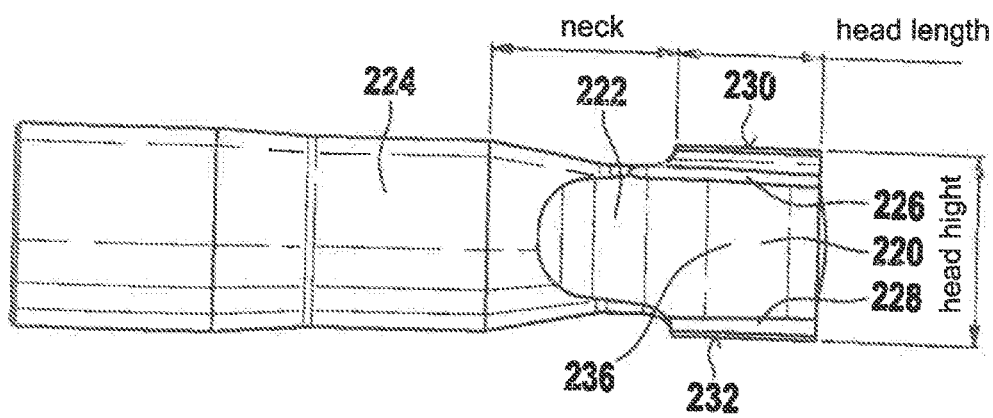
Fig. 10
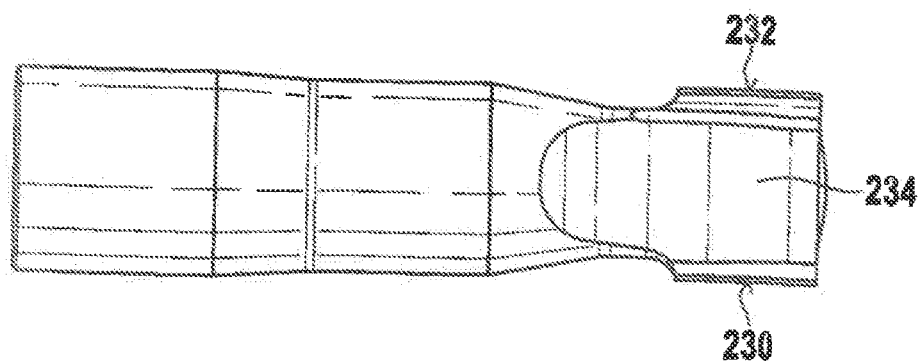
Fig. 11

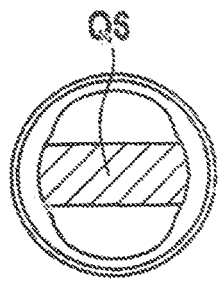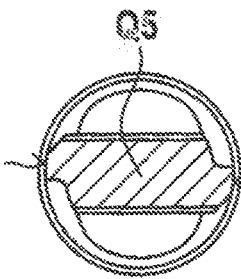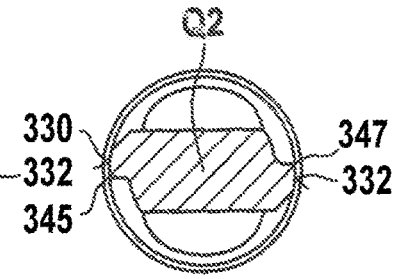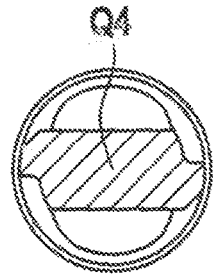
Fig. 16 (C-C)   Fig. 17 (B-B)   Fig. 18 (A-A)   Fig. 18a (G-G)
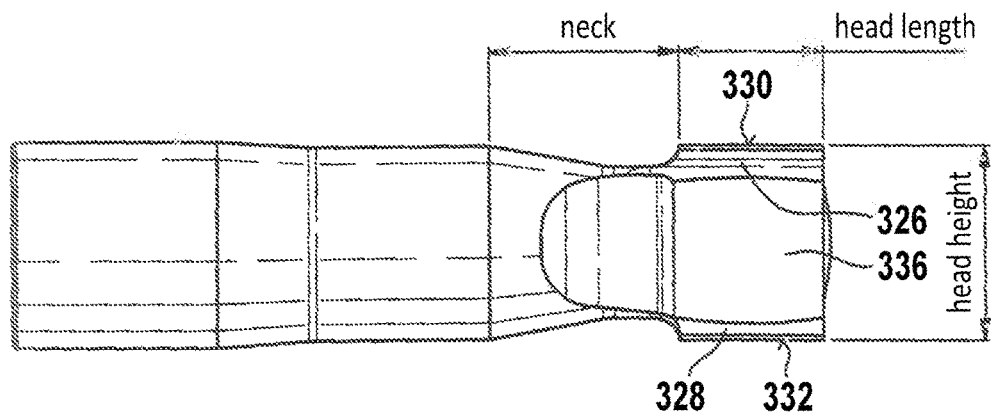
Fig. 19
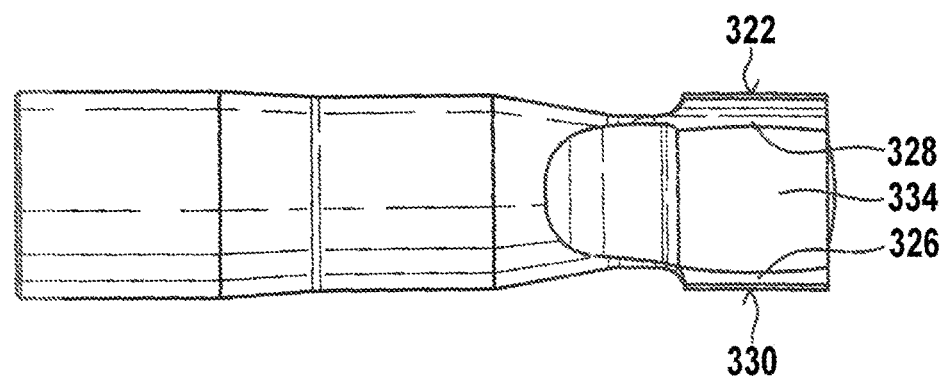
Fig. 20

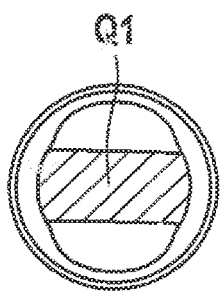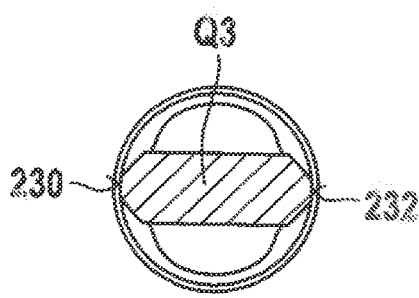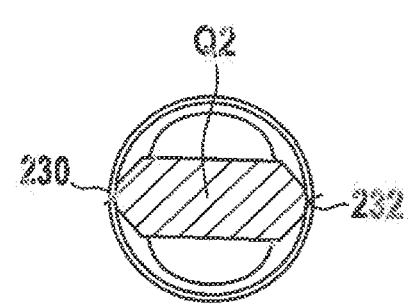
Fig. 25 (C-C)  Fig. 26 (B-B)  Fig. 27 (A-A)
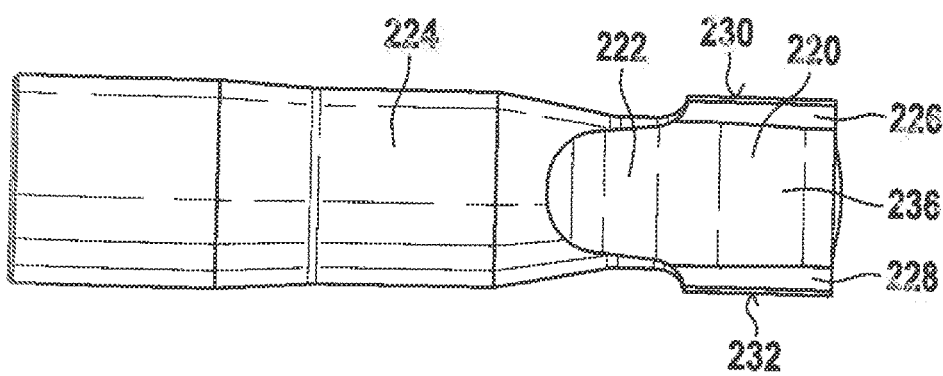
Fig. 28
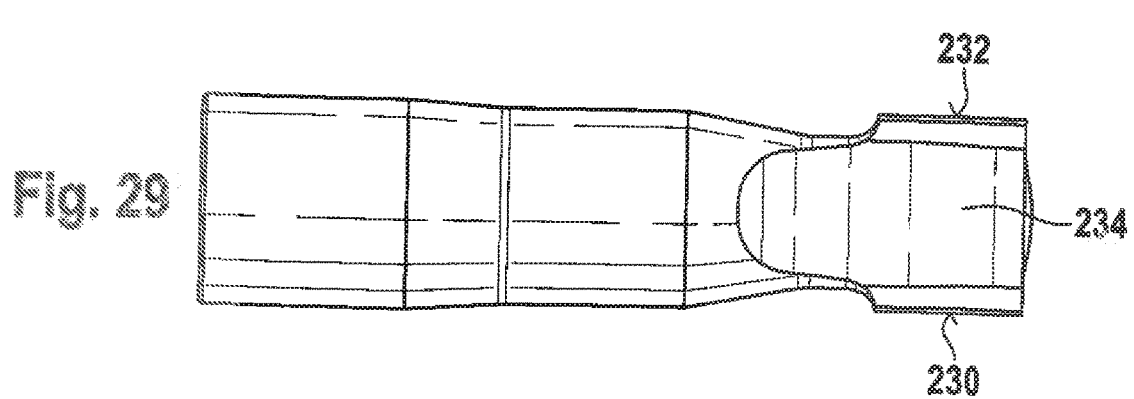
Fig. 29

SONOTRODE AND METHOD FOR INFLUENCING THE VIBRATORY BEHAVIOR OF A SONOTRODE

The invention relates to a sonotrode of an ultrasonic welding device with a sonotrode body with sonotrode head with at least one working surface running in the longitudinal direction of the sonotrode head for welding or welding together and/or deforming and/or cutting at least one item of metallic welding material, wherein the sonotrode head has mutually differing cross-sections along the working surface.

The invention also relates to a method for influencing the vibration behaviour of a sonotrode head of a longitudinally vibrating sonotrode of an ultrasonic metal welding device for welding, welding together, deforming and/or cutting of metallic welding material, wherein the sonotrode head is connected to a sonotrode body via a neck, and the sonotrode head has working surfaces running diametrically and in particular parallel to one another in the longitudinal direction of said head, which working surfaces extend along first longitudinal sides of the sonotrode head, which are in turn connected via second longitudinal sides.

When joining materials ultrasonically the energy required for welding is introduced into the welding material in the form of mechanical vibrations, wherein the sonotrode is coupled to the part to be joined facing it and moves it. Pressure is simultaneously applied. Welding together takes place through interaction of the static and dynamic forces, without the need for further consumables. In the case of ultrasonic metal welding, the mechanical vibrations are oriented parallel to the surface to be joined. A complex relationship arises between static force, vibrating shear forces and a moderate temperature rise in the welding zone. To this end, the material or the materials is/are disposed between the vibrating sonotrode and a static counter-electrode.

Ultrasonic metal welding is also used for fluid-tight sealing and separation of metal tubes, as are required for refrigeration units, in particular air-conditioning devices or refrigerators. Devices with which corresponding welding operations are carried out are revealed, for example, by DE 103 60 623 B3 or DE 10 2015 206 866 B3.

To achieve high quality reproducible welding results, deflection of the sonotrode, i.e. of the sonotrode head, should take place predominantly in the longitudinal direction thereof, i.e. in the direction of the ultrasonic vibrations. To prevent or reduce corresponding deflection perpendicular to the direction of ultrasonic vibration, DE 50 2004 002 817 C5 provides reinforcing the sonotrode head in the end face region, which reinforcement may take the form of a rib.

If the vibrations are oriented parallel to the surface to be joined during ultrasonic metal welding, the vibrations during ultrasonic plastics welding run perpendicular to the surface to be joined. The sonotrode head itself may have differing cross-sectional areas on the input and output sides, as may be inferred from DE 203 14 781 U1.

Sonotrode heads intended for ultrasonic metal welding, with working surfaces which act on the welding material successively in different positions to even out wear and thus maximise the degree of utilisation, exhibit the disadvantage that, after utilisation of a new region of the working surface, parameters have to be redetermined so as to be able to achieve optimum welding results. This means that downtimes have to be taken into account. In this respect, positions are changed for example after a thousand welding operations.

The object of the present invention is further to develop a sonotrode of the above-stated type in such a way that downtimes caused by the process of changing the welding position are reduced while at the same time maintaining high welding result quality. It is intended to optimise the vibration behaviour of the sonotrode head and to achieve welding operations of uniform quality.

To achieve this object, in accordance with the teaching according to the invention a sonotrode of the above-stated type is substantially further developed in such a way that the cross-section of the sonotrode head is greater at the end region, extending at the end face, of the working surface than in the middle region of the working surface.

The cross-section of the sonotrode head is particularly preferably formed to reduce from the end region of the working surface extending at the end face up to the end region of the working surface on the sonotrode body side, wherein the cross section in particular changes constantly. In this case, the sonotrode head may optionally initially have a constant cross-section in the end region thereof, this cross-section then reducing.

Provision is alternatively made for the cross-section of the sonotrode head initially to reduce from the end region of the working surface extending at the end face and then to increase to the end region of the working surface on the sonotrode body side. Provision is made, in particular, for in particular the cross-section of the sonotrode body to be at its smallest in the middle region of the working surface.

It has surprisingly been found that, as a result of a specific geometric formation of the sonotrode head of an ultrasonic metal welding device, i.e. as a result of the change in cross-section according to the invention, the vibration behaviour or transformation ratio is modified in such a way that deviations arising in the case of position changes that have been made to welding operations are less significant than in the case of sonotrodes which have a constant cross-section. It was possible to identify amplitude smoothing, to the effect that the change in amplitude as a function of welding position is less than in the case of sonotrodes with a constant cross-section along the working surface, such that more welding operations can be carried out without needing to redetermine the parameters. Downtimes can be reduced in length, with the consequence that it proved possible to increase the number of welding operations per unit time.

The invention is distinguished, in particular in terms of a sonotrode head with initially reducing cross-section which then increases again, in that the cross-section of the neck is reduced in the region of its smallest cross-section compared with sonotrode heads of uniform cross-section along the working surface or surfaces, whereby an inherent vibration behaviour of the sonotrode head is achieved by which the vibration behaviour is smoothed regardless of different welding positions.

In accordance with the prior art, the sonotrode head should have two diametrically opposing working surfaces running in particular parallel to one another and starting from first longitudinal sides of the sonotrode head, wherein the first longitudinal sides are connected together via second longitudinal sides. According to the invention, provision is then made for the cross-sectional change of the sonotrode head to take place in the region of the working surfaces by changing the profile of the second longitudinal sides.

In particular, the invention provides,
   that the cross-section of the sonotrode head in the end-face end region of the working surfaces is Q2, that in the case of the cross-section starting from the end-face end region of the working surface and tapering up to the sonotrode body-side end region of the working surface, the cross-section of the sonotrode head is Q3 in the sonotrode body-side end region and the neck runs through a line or a region of smallest cross-section Q1, that in the case of a cross-section starting from the end region of the working surface extending at the end face and initially reducing and then increasing towards the end region of the working surface on the sonotrode body side, the sonotrode head is Q5 in the region of smallest cross-section between the end regions of the working surface extending at the end face and on the sonotrode body side, wherein the cross-section in the end region of the working surface on the sonotrode body side is Q4 and the neck runs through a line or a region of smallest cross-section Q6, wherein Q2:Q1 is between 2.0:1 and 1.1:1 and/or
Q2:Q3 is between 2.0:1 and 1.05:1 and/or
Q2:Q5 is between 2.0:1 and 1.05:1 and/or
Q2:Q6 is between 2.0:1 and 1.1:1 and/or
Q4:Q5 is between 2.0:1 and 1.05:1 and/or
Q3:Q1 is between 1.5:1 and 1.1:1 and/or
Q5:Q6 is between 1.5:1 and 1.1:1 and/or with the secondary condition that Q1 is smaller than Q2, Q3 and Q6 are smaller than Q2, Q4, Q5 and Q3 are smaller than Q2 and Q5 is smaller than Q2, Q4, wherein in particular Q2:Q3 is between 1.05:1 and 1.20:1, preferably between 1.05:1 and 1.15:1, in particular approximately 1.1:1, and/or in particular Q5:Q6 is 1.21:1 to 1.30:1, in particular approximately 1.26:1, and/or in particular Q2:Q6 is between 1.40:1 and 1.55:1, in particular approximately 1.47:1, and/or in particular Q2:Q5 is between 1.12:1 and 1.20:1, in particular approximately 1.16:1, and/or in particular Q2:Q1 is between 1.22:1 and 1.30:1, in particular approximately 1.26:1, and/or in particular Q2:Q4 is between 1:1 and 1.04:1, in particular approximately 1.02:1.

A method for influencing the vibration behaviour of a sonotrode head of a longitudinally vibrating sonotrode of an ultrasonic metal welding device, wherein the sonotrode head is connected to a sonotrode body via a neck, and the sonotrode head has working surfaces running diametrically and parallel to one another in the longitudinal direction of said head, which working surfaces extend along first longitudinal sides of the sonotrode head, which are in turn connected via two second longitudinal sides, is distinguished in particular in that a sonotrode head is used whose second longitudinal sides are machined in such a way that a cross-sectional change takes place to the sonotrode head along the working surfaces.

At least one working or welding surface runs along each first longitudinal side, and along said surface a cutting edge optionally extends. Two working surfaces may also run along each first side surface, between which working surfaces there extends a raised portion with two cutting edges. The associated sonotrode geometries are intended in particular for welding and separation of metal tubes, as are used for refrigeration units.

The second longitudinal sides are here machined in such a way that the spacing of the longitudinal sides reduces from the end region of the working surface extending at the end face up to the end region of the working surfaces extending on the sonotrode body side.

It is however also possible for machining of the second side faces of the sonotrode head to proceed in such a way that the second side faces receive a concave profile. It is in particular provided that, compared with sonotrode heads with a uniform cross-section along the working surfaces, the neck is tapered in such a way that the ratio of the cross-section Q2 in the end region of the working surface extending at the end face to the smallest cross-section Q6 of the neck is such that Q2:Q6 is between 2.0:1 and 1.1:1, preferably between 1.40:1 and 1.55:1, in particular approximately 1.47:1.

The smallest cross-section Q5 between the end regions of the working surfaces extending at the end face should be in a ratio to the smallest cross-section Q6 of the neck of between 1.5:1 and 1.1:1, preferably between 1.21:1 and 1.30:1, in particular approximately 1.26:1.

In the case of a cross-section reducing substantially constantly from the end region extending at the end face towards the end region of the working surfaces on the sonotrode body side, the largest cross-section Q2 in the region of the working surface should be in a ratio to the smallest cross-section Q1 of the neck of between 2.0:1 and 1.1:1, preferably between 1.22:1 to 1.30:1, in particular approximately 1.26:1.

The cross-section Q2 in the end region of the working surface of the sonotrode head at the end face should be in the following ratio to the cross-section Q3 in the end region of the working surface on the sonotrode body side: Q2:Q3 between 2.0:1 and 1.05:1, preferably between 1.05:1 to 2.0:1, in particular 1.05:1 and 1.5:1, preferably approximately 1.1:1.

Further details, advantages and features of the invention are revealed not only by the claims and the features to be inferred therefrom, alone and/or in combination, but also by the preferred exemplary embodiments to be inferred from the following description of the drawings, in which:

Figure 3:
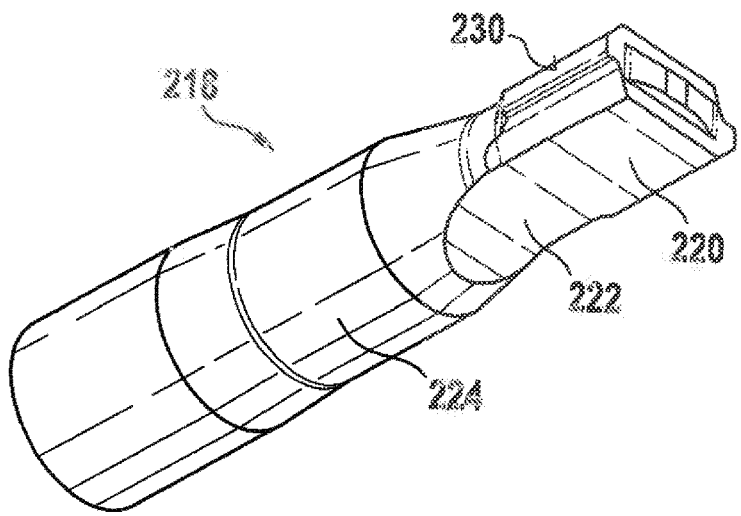
FIG. 3 shows a first embodiment of a sonotrode according to the invention.
Figure 4:
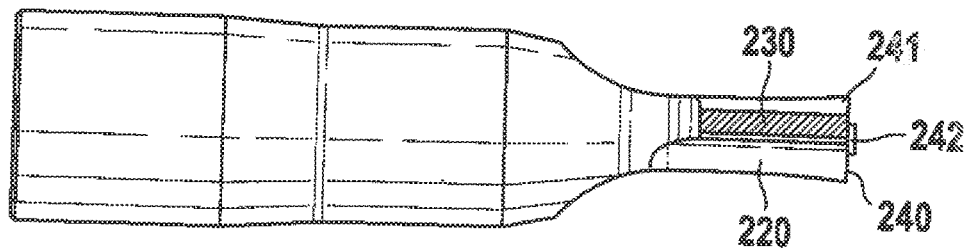
FIG. 4 is a plan view of the sonotrode according to FIG. 3.
Figure 5:
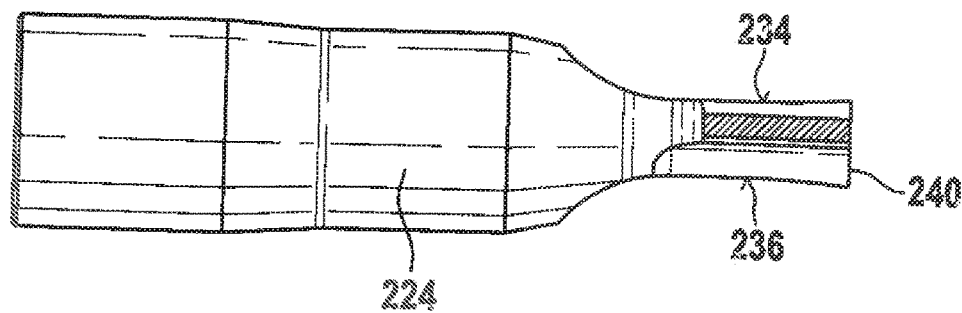
Figure 6:
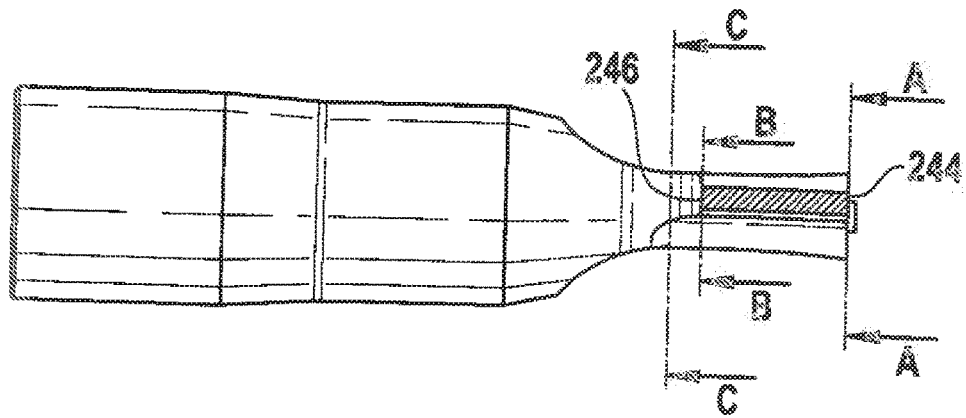
Figure 12:
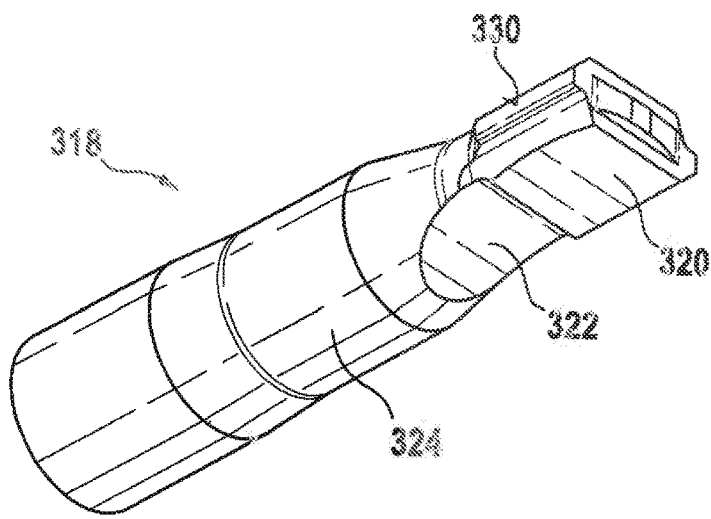
Figure 13:
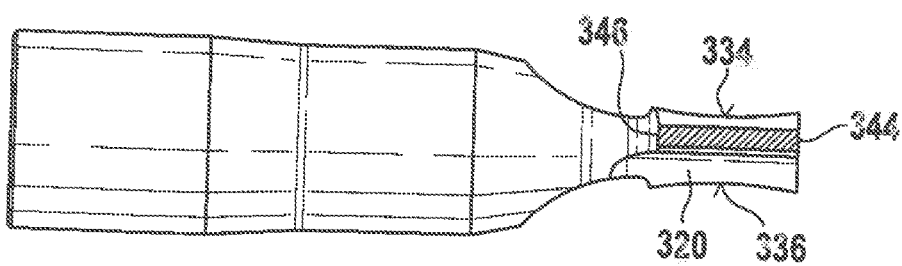
Figure 14:
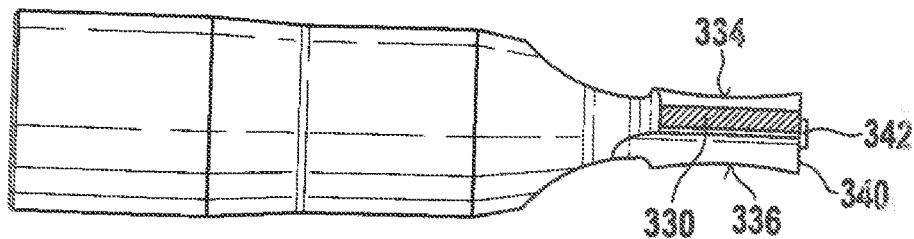
Figure 15:
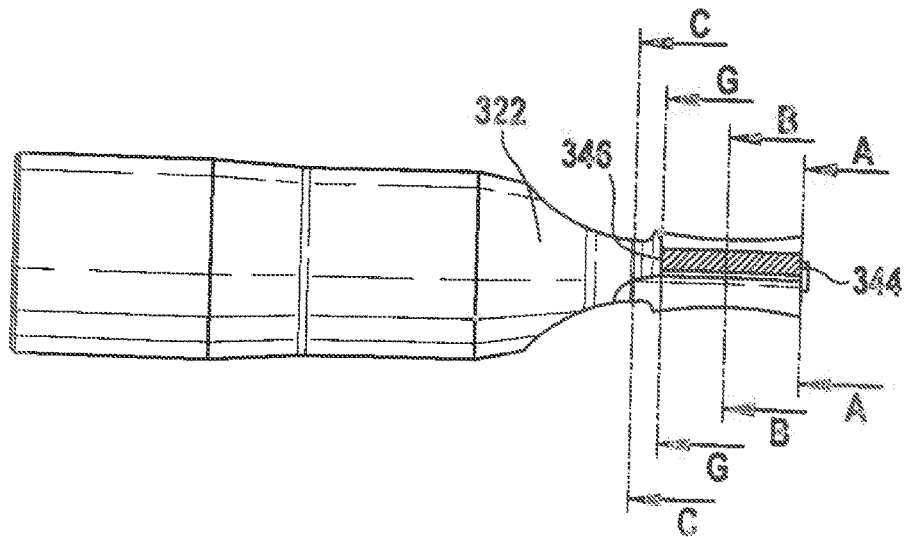
Figure 21:
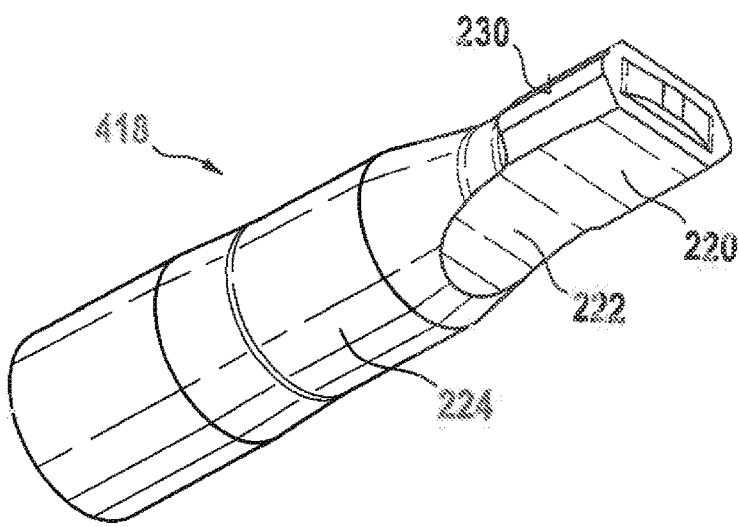
Figure 22:
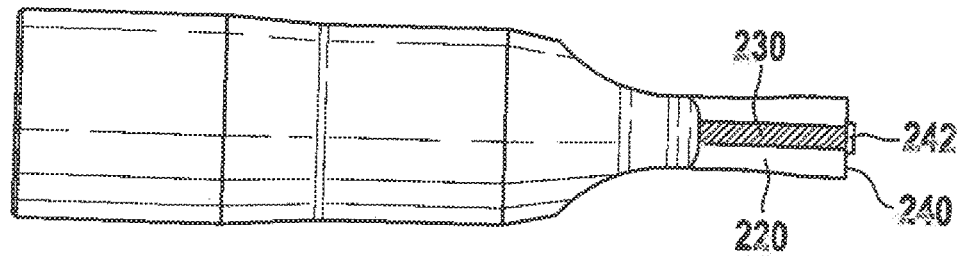
Figure 23:
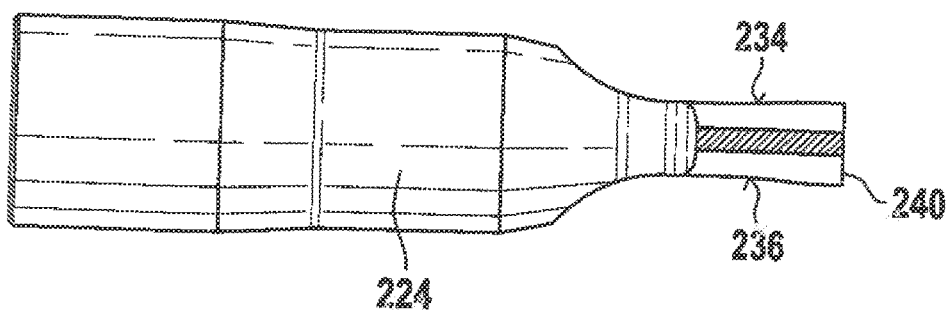
Figure 24:
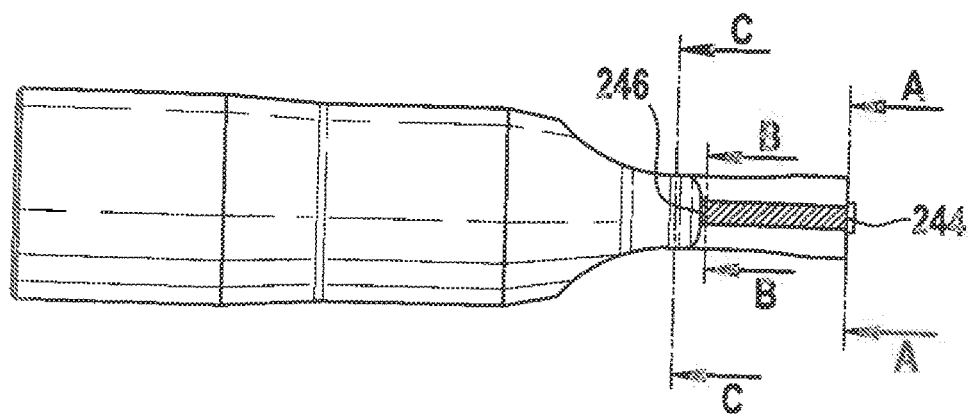

FIG. 5 shows a sonotrode according to FIG. 3 without a reinforcing means, FIG. 6 shows the representation according to FIG. 4 with section lines, FIG. 7 shows a section along line C-C in FIG. 6, FIG. 8 shows a section along line B-B in FIG. 6, FIG. 9 shows a section along line A-A in FIG. 6, FIG. 10 is a first side view of the sonotrode according to FIG. 3, FIG. 11 is a second side view of the sonotrode according to FIG. 3, FIG. 12 shows a second embodiment of a sonotrode according to the invention, FIG. 13 is a plan view of the sonotrode according to FIG. 12, FIG. 14 shows a variant of the sonotrode according to FIG. 12, FIG. 15 shows a representation according to FIG. 14 with section lines, FIG. 16 shows a section along line C-C in FIG. 15, FIG. 17 shows a section along line B-B in FIG. 15, FIG. 18 shows a section along line A-A in FIG. 15, FIG. 19 is a first side view of the sonotrode according to FIG. 12, FIG. 20 shows a second side view of the sonotrode according to FIG. 12 and FIGS. 21-29 show a variant of the sonotrode according to FIGS. 3-11.

The teaching according to the invention, on the basis of which the vibration behaviour of a sonotrode is improved, will be explained in greater detail with reference to the figures, in which the same elements may be provided with the same reference signs.

Figure 1:
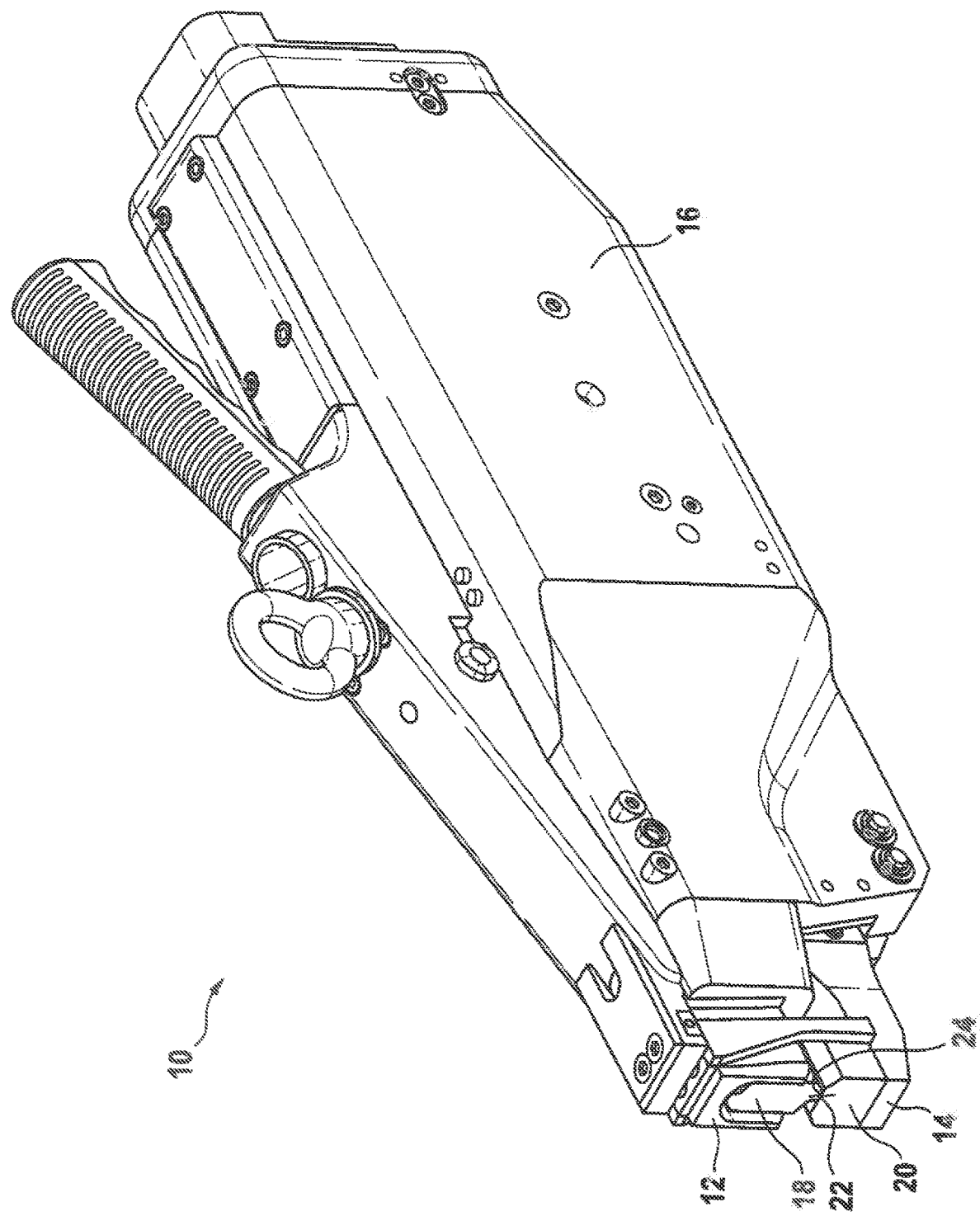
FIG. 1 is a schematic representation of an ultrasonic welding device.

FIG. 1 shows a schematic representation of an ultrasonic welding device in the form of ultrasonic welding tongs 10, which have an upper and a lower tong part 12, 14 disposed in a housing 16. The upper tong part 12 has as essential component an ultrasonic vibration means with sonotrode 18 disposed in the front part of the housing 16, this forming a first welding jaw. The sonotrode 18 may be set in longitudinal vibration.

Opposite the sonotrode 18 there is disposed a counter-electrode or anvil 20 in the lower part of the housing 14. The anvil 20 is formed to be swivelable relative to the sonotrode 18 by way of a swivel axis (not shown), such that an item of welding material, such as a metal tube, disposed between the working or welding surface 22 and the working surface 24 associated therewith of the anvil 20 can be easily severed, with simultaneous pinching off and welding.

The teaching according to the invention is not restricted thereby, however. Rather, it applies wholly generally to the configuration of sonotrodes with which welding material consisting of metal is to be welded or welded and deformed.

Figure 2:
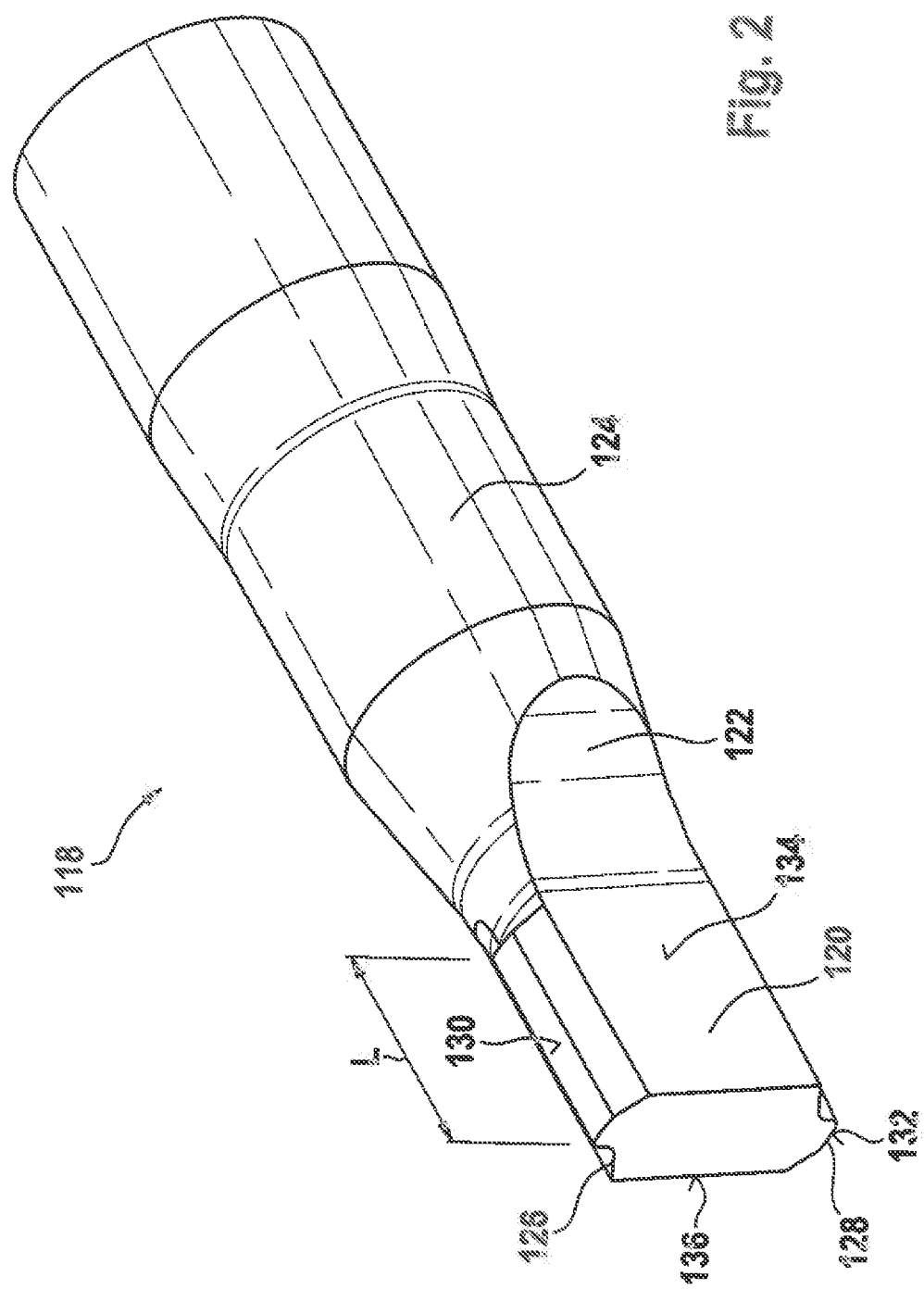
FIG. 2 shows a sonotrode according to the prior art.

The sonotrode 18 has a working surface running in the longitudinal direction thereof, as is clear from FIG. 2, which shows a sonotrode 118 according to the prior art.

The sonotrode 118 has a sonotrode head 120, which merges into a sonotrode body 124 via a sonotrode neck 122. The sonotrode head 120 has working surfaces 130, 132 on diametrically opposing first longitudinal sides 126, 128, which surfaces may preferably run parallel to one another and have a longitudinal extent L of between 10 mm and 100 mm. The first longitudinal sides or surfaces 126, 128 are connected via second side faces 134, 136, which run parallel to one another.

In order to optimise the utilisation rate of the sonotrode 118, after a specified number of welding operations a change in welding position takes place, i.e. on welding the material to be welded is contacted in different positions of the working surface 130 or, after rotation of the sonotrode 118, with the working surface 132, which may also be designated a welding surface.

In conventional operations, position adjustment may take place for example after 1000 welding operations, to even out wear. This maximises the utilisation rate.

After adjusting the welding position, it is necessary, however, to redetermine parameters in order to achieve optimum welding results. Corresponding parameter determination and setting is carried out by qualified personnel. For the parameters to be determined, the ultrasonic welding device has to be out of use, the consequence of which is that cost drawbacks arise due to the downtimes in the production procedure caused thereby.

According to the invention, the sonotrode head is configured in such a way that it is not necessary for parameter determination to have to take place after each change in welding position, since smoothing of the vibration behaviour or of the amplitude of the sonotrode takes place regardless of a change in the position of the material to be welded.

FIGS. 3 to 11 show a first embodiment of a sonotrode 218, which follows the teaching according to the invention. The sonotrode 218 again consists of a sonotrode head 220, a neck 222 and a sonotrode body 224.

Along opposing first longitudinal sides or faces 226, 228 of the sonotrode head 220 there run mutually parallel working surfaces 230, 232, which perform the function of welding surfaces and at the same time allow deforming of welding material, as is the case with the welding and pinching off of tubes, as has been explained above. In addition, in the exemplary but non-limiting embodiment the working surfaces 230, 232 are defined by a cutting edge 245, 247, so as to enable severing of such tubes. To this end, the counter-electrode associated with the sonotrode 218 or the sonotrode head 220 has a corresponding edge.

The sonotrode head 20 consequently has a geometry as may in principle be inferred from FIG. 2 of DE 103 60 623 B3. The edge of the anvil associated with the cutting edge may also be inferred therefrom.

The teaching according to the invention is also intended in particular for sonotrodes which have two cutting edges, as may be inferred from FIG. 3 of DE 103 60 623 B3. Reference is also made explicitly to the associated disclosures, which are thus also included in the subject matter of the present description.

However, the invention is not restricted to such an embodiment. Rather, the teaching according to the invention applies to conventional sonotrodes with which metal is welded, i.e. also sheet metal, stranded wires and the like.

The length of the neck 222 and that of the sonotrode head 220 is shown in FIG. 10. The height of the head 220 corresponds to the spacing of the working surfaces 230, 232.

A plan view of the sonotrode 218 may be inferred from FIG. 4. The exemplary embodiment of FIG. 5 differs from that of FIG. 4 solely in that no reinforcing means 242, such as a rib, projects beyond the end face 240, in order to reduce undesired deflection perpendicular to the direction of vibration. The reinforcing means 242 is in line with the teaching of DE 50 2004 002 817 C5.

In contrast to the conventional sonotrode 118 as may be inferred from FIG. 2, the sonotrode head 220 has a cross-sectional profile along the working or welding surfaces 230, 232 such that in the region of the working surface 230, 232 extending at the end face the sonotrode head 220 has a larger cross-section than in the end region of the working surface 230, 232 extending on the sonotrode body side. The end face region is identified in FIG. 6 with reference sign 244 and the body-side end region with reference sign 246.

The spacing of the second side faces 234, 236 connecting the first longitudinal side faces 226, 228 consequently reduces from the end face 240 towards the sonotrode body 224, as is clear in particular from the sectional representations of FIG. 8 and FIG. 9. It should be noted that, starting from the end face 240, the sonotrode head 220 may firstly have a region 241 in which the cross-section of the sonotrode head 220 is initially constant. This configuration may however be subsumed by the statement that, starting from the end face 240, the spacing of the second side faces 234, 236 reduces in the direction of the sonotrode body 224.

The section according to FIG. 7 is the section along line C-C in which the sonotrode neck 222 has the smallest cross-section. This cross-section is identified as Q1. The section along line A-A (FIG. 9) is that of the sonotrode head 220 in which extends the end-face end region 244 of the working surface 230, 232. The cross-section is identified as Q2.

Furthermore, in the body-side end region 246 of the working surface 230, 232 there is a further section B-B, which is identified in FIG. 8 with reference sign Q3. The cross-sections should preferably be in the following ratios to one another:

| | |
|---|---|
| Q2:Q3 | between 1.05:1 and 1.20:1, preferably between 1.05:1 and 1.15:1, in particular approximately 1.1:1 |
| Q2:Q1 | between 1.22:1 and 1.3 0:1, in particular approximately 1.26:1 |
| Q3:Q1 | between 1.12:1 and 1.20:1, in particular approximately 1.16:1. |

It should be noted that, with an associated design of the sonotrode head 220, changes to other components of the sonotrode 218 are in principle unnecessary, i.e. the geometry of the neck 222 and of the sonotrode body 224 may correspond to that of the sonotrode 118, in which the sonotrode head 120 has a uniform cross-section over the length of the working surfaces 130, 132, i.e. the side faces 134, 136 run parallel to one another.

A further embodiment of a sonotrode 318 configured according to the invention may be inferred from FIGS. 12 to 20 and again differs from sonotrode 118 with regard to the sonotrode head 320. Irrespective thereof, the sonotrode head 320 again merges into a sonotrode body 324 via a sonotrode neck 322.

In the isometric representation according to FIG. 12, a reinforcing means 342 extends from the end face 340; this is not an essential feature, as is clear from FIG. 13.

According to the exemplary embodiment of FIGS. 3 to 11, the sonotrode head 320 has working or welding surfaces 330, 332 extending along two first, narrow side faces 326, 328, which working or welding surfaces are each defined by a cutting edge 345, 347, with which a corresponding cutting edge in the counter-electrode is associated so as to be able to sever metal tubes on welding thereof. It goes without saying that two cutting edges are provided on each first side face 326, 628, these extending between working or welding surfaces as may be inferred from FIG. 3 of DE 103 60 623 B3.

The first longitudinal side faces 326, 328 are connected via two second side faces 334, 336, which have a profile as explained below, in order to configure the sonotrode head 320 in accordance with the teaching according to the invention in such a way that said head has a profile of varying cross-section along the working or welding surfaces 330, 332. The boundaries of the working surfaces 330, 332 are identified with reference signs 344, 346.

As is clear in particular from the plan views according to FIGS. 13 to 15, the sonotrode head 320 has a geometry such that the second side faces 334, 336 display a concave profile, i.e. the cross-section in the end-face end region 344 of the sonotrode head 320 is greater than the middle region (section B-B in FIG. 15). In the sonotrode body-side end region 346 the sonotrode head 320 has approximately the cross-section of the end-face end region 344. The concave profile of the second side face 334, 336 is such that a symmetrical profile results along a plane in which on the one hand the longitudinal axis of the sonotrode 318 extends and which on the other hand extends parallel to the working or welding surfaces 330, 332.

In accordance with the sectional representation according to FIGS. 17 and 18, the cross-section of the sonotrode head 320 in the end-face end region 344 of the working surface 330, 332 is Q2 and in the middle region, i.e. in the region of smallest cross-section, the cross-section is Q5. No section is shown in the end region 346 extending on the sonotrode body side. This preferably corresponds to cross-section Q2.

In contrast to the design of the sonotrode 218, in the case of the concave profile of the second side faces 334, 336 a change to the neck 322 takes place such that the latter is more extensively tapered, i.e. the smallest cross-section (section C-C) Q6 is smaller than the smallest cross-section Q1 of sonotrode 218. The cross-sectional ratios should in particular be as follows:

| | |
|---|---|
| Q2:Q6 | between 1.40:1 and 1.55:1, in particular approximately 1.47:1, |
| Q2:Q5 | between 1.12:1 and 1.20:1, in particular approximately 1.16:1, |
| Q5:Q6 | between 1.21:1 and 1.30:1, in particular approximately 1.26:1. |

The exemplary embodiment of FIGS. 21 to 29 basically corresponds to that of FIGS. 3 to 11 except that the sonotrode head 220 does not have any cutting edges which extend along the working surfaces 230, 232. Otherwise the sonotrode 418 has the same geometry as the sonotrode 214, and therefore the same reference signs are used. The description of the sonotrode 218 applies equally to the sonotrode 418.

The invention claimed is:

1. A sonotrode used for metallic welding, comprising:
   a sonotrode body including a sonotrode head;
   wherein the sonotrode head comprises diametrically opposed working surfaces extending in a longitudinal direction of the sonotrode and running parallel to each other, and diametrically opposed side surfaces extending in a longitudinal direction of the sonotrode, and connecting said working surfaces;
   wherein a transverse cross-section of the sonotrode head in an end region of the working surfaces is greater than in a middle region of the working surfaces; and
   wherein an increase or decrease in the transverse cross-section of the sonotrode head results from a change in distance between the side surfaces.

2. The sonotrode according to claim 1, wherein the transverse cross-section of the sonotrode head reduces from the end region of the working surfaces, extending at the end-face up to an end region on a side of the sonotrode body.

3. The sonotrode according to claim 1,
   wherein the sonotrode head has working surfaces extending parallel to one another at first longitudinal sides;
   wherein the first longitudinal sides are connected via second longitudinal sides; and
   wherein the increase or decrease in the transverse cross-section of the sonotrode head takes place by changing the profile of the second longitudinal sides.

4. The sonotrode according to claim 1,
   wherein the sonotrode head is connected to the sonotrode via a sonotrode neck;
   wherein the cross-section of the neck reduces starting from the sonotrode head, passes through a line or a region of smallest cross-section, and then increases again towards the sonotrode body, wherein the cross-section of the sonotrode head is Q2 in the end-face end region of the working surfaces;
   wherein, in a cross-section of the sonotrode body tapering from the end-face end region of the working surfaces, up to the end region on a side of the sonotrode body, the cross-section in the sonotrode body-side end region is Q3, and the smallest cross-section of the neck of Q1; or
   wherein, in a cross-section initially reducing from the end region of the working surfaces extending at the end-face, and then increasing to the sonotrode body-side end region, the cross-section in the sonotrode body-side end region is Q4, the cross-section in the region of smallest cross-section between end-face and sonotrode body-side end region is Q5, the cross-section in the end region extending at the end-face is Q2, and the smallest cross-section of the neck is Q6, and wherein:

Q2:Q1 is between 2.0:1 and 1.1:1, and/or
Q2:Q3 is between 2.0:1 and 1.05:1, and/or
Q2:Q5 is between 2.0:1 and 1.05:1, and/or
Q2:Q6 is between 2.0:1 and 1.1:1, and/or
Q4:Q5 is between 2.0:1 and 1.05:1, and/or
Q3:Q1 is between 1.5:1 and 1.1:1, and/or
Q5:Q6 is between 1.5:1 and 1.1:1, and/or
with a secondary condition that Q1 is smaller than Q2, Q3, and Q6 are smaller than Q2, Q4, Q5, and Q3 are smaller than Q2, and Q5 is smaller than Q2, Q4.

5. The sonotrode according to claim 1, wherein the cross-section of the sonotrode head reduces constantly from the end region of the working surfaces extending at the end-face up to an end region on a side of the sonotrode body.

6. The sonotrode according to claim 4, wherein Q2:Q3 is between 1.05:1 and 1.20:1.

7. The sonotrode according to claim 4, wherein Q2:Q3 is between 1.05:1 and 1.15:1.

8. The sonotrode according to claim 4, wherein Q2:Q3 is approximately 1.1:1.

9. The sonotrode according to claim 4, wherein Q5:Q6 is 1.21:1 to 1.30:1.

10. The sonotrode according to claim 4, wherein Q5:Q6 is approximately 1.26:1.

11. The sonotrode according to claim 4, wherein Q2:Q6 is between 1.40:1 and 1.55:1.

12. The sonotrode according to claim 4, wherein Q2:Q6 is approximately 1.47:1.

13. The sonotrode according to claim 4, wherein-Q2:Q5 is between 1.12:1 and 1.20:1.

14. The sonotrode according to claim 4, wherein-Q2:Q5 is approximately 1.16:1.

15. The sonotrode according to claim 4, wherein Q2:Q1 is between 1.20:1 and 2.20:1.

16. The sonotrode according to claim 4, wherein Q2:Q1 is between 1.22:1 and 1.30:1.

17. The sonotrode according to claim 4, wherein Q2:Q1 is approximately 1.26:1.

18. The sonotrode according to claim 4, wherein Q2:Q4 is between 1:1 and 1.04:1.

19. The sonotrode according to claim 4, wherein Q2:Q4 is approximately 1.02:1.

* * * * *